United States Patent [19]

Hayden

[11] Patent Number: 4,653,090
[45] Date of Patent: Mar. 24, 1987

[54] GRAPHICS BASED CALL MANAGEMENT

[75] Inventor: Charles C. Hayden, Fair Haven, N.J.

[73] Assignees: American Telephone & Telegraph (AT&T), New York, N.Y.; AT&T Information Systems (AT&T-IS), Holmdel, N.J.

[21] Appl. No.: 809,410

[22] Filed: Dec. 16, 1985

[51] Int. Cl.$^4$ ............................................. H04M 3/56
[52] U.S. Cl. ....................................... 379/204; 379/396
[58] Field of Search ............ 179/2 DP, 2 TV, 18 BC, 179/27 D, 8 A, 18 B; 370/62; 358/85, 210

[56] References Cited

U.S. PATENT DOCUMENTS

| | | | |
|---|---|---|---|
| 4,389,720 | 6/1983 | Baxter et al. | 370/62 |
| 4,453,217 | 6/1984 | Boivie | 364/300 |
| 4,512,016 | 4/1985 | Fulcomer et al. | 370/110.1 |
| 4,512,017 | 4/1985 | Sharp | 370/110.1 |
| 4,516,156 | 5/1985 | Fabris et al. | 179/18 BC |
| 4,542,375 | 9/1985 | Kubik | 340/712 |

FOREIGN PATENT DOCUMENTS 0041902 of 0000 European Pat. Off. ....... 179/18 BC

Primary Examiner—James L. Dwyer
Attorney, Agent, or Firm—David H. Tannenbaum

[57] ABSTRACT

There is disclosed a method of setting up, manipulating, and taking down communication connections. The telephone instrument would include a graphics screen, such as a PC, and a series of call appearance boxes would be represented on the screen. Each possible party to a connection would be represented by a picture (icon generated upon request for a particular party) and an associated label (the party's name). The icon representative of a party is moved, by use of a cursor, inside a communication appearance box on the screen to place that party on the call. The icon would be moved out of the box to drop the party from the call. In this manner, two-party, as well as conference, calls can be established.

63 Claims, 29 Drawing Figures

LOCAL PARTY STATE TRANSITIONS

REMOTE PARTY STATE TRANSITIONS

USER ACTIONS

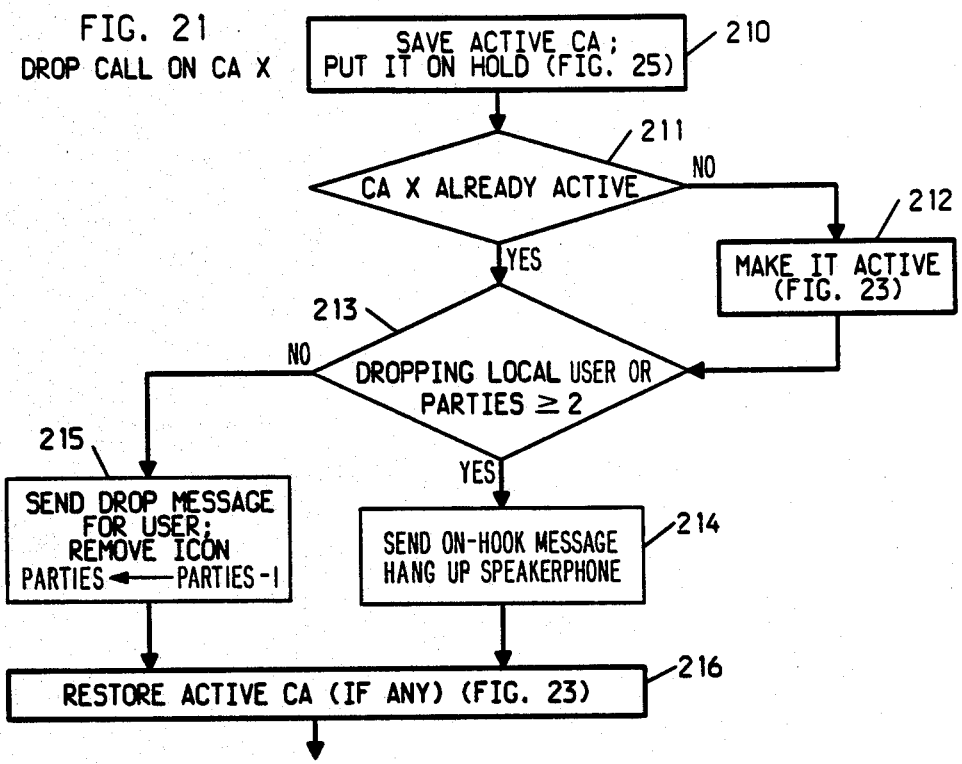
FIG. 21 DROP CALL ON CA X
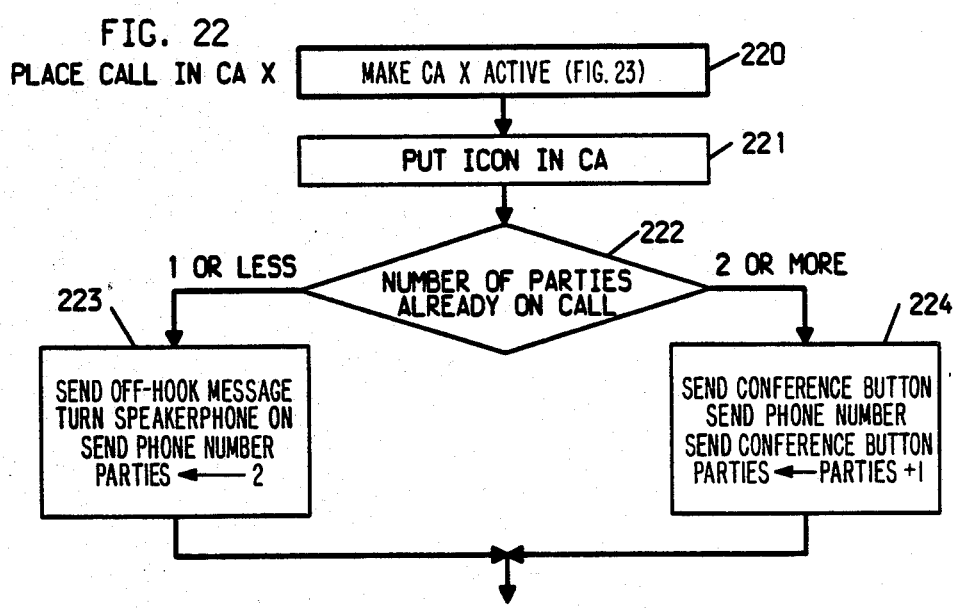
FIG. 22 PLACE CALL IN CA X

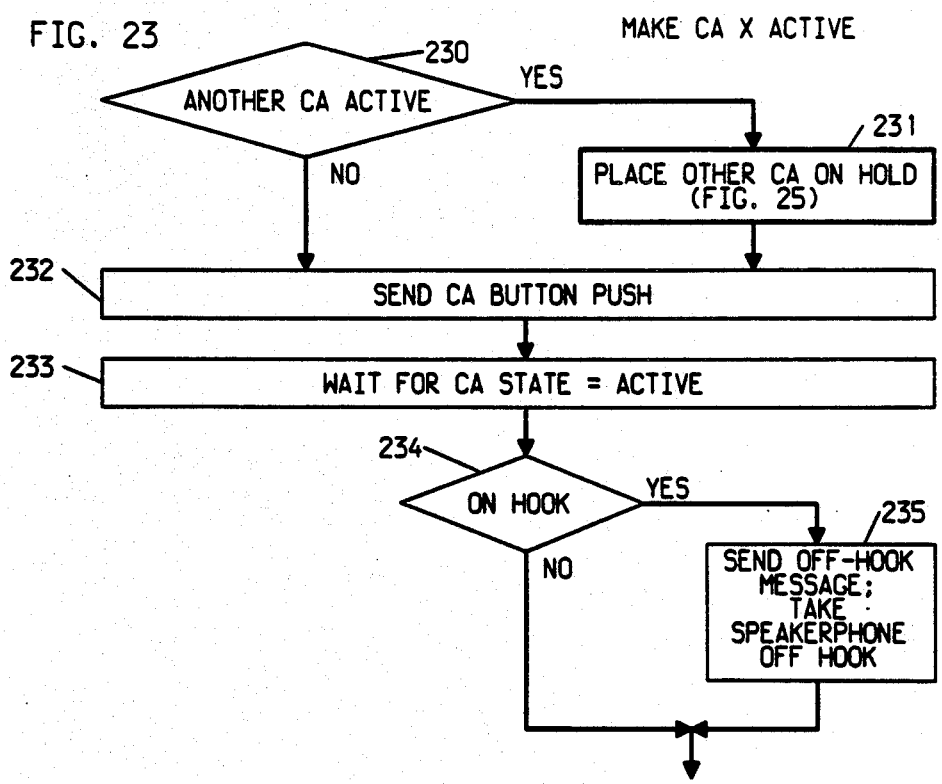
FIG. 23 — MAKE CA X ACTIVE
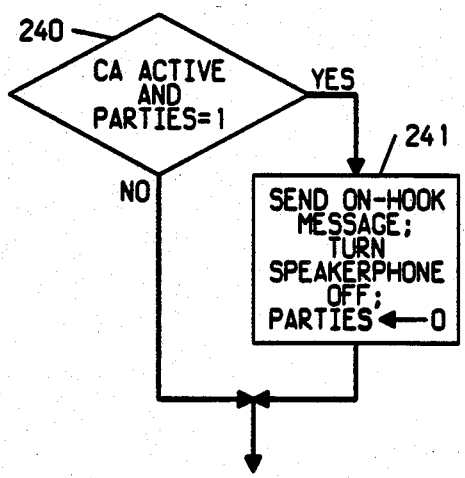
FIG. 24 — DROP DIAL TONE
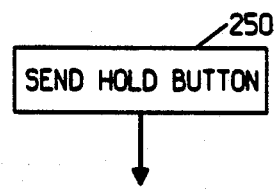
FIG. 25 — PLACE ACTIVE CALL ON HOLD

LAMP UPDATE RESPONSE

RINGER UPDATE RESPONSE

REMOTE DROP

REMOTE ADD

GRAPHICS BASED CALL MANAGEMENT

FIELD OF THE INVENTION

This invention relates to communication system call establishing arrangements and more particularly to a system which allows for visual observation and control of call establishment, and even more specifically, of call conferencing.

BACKGROUND OF THE INVENTION

The use of telephone equipment has become so commonplace today that even to discuss such use makes little sense. But the reality is that the majority of communication connections are between two parties, each communicating from a standard telephone set. The communicating requirements of the public are becoming more sophisticated and so are the terminals which form the end points of such connections.

There was a time when a telephone station set had connected to it only a single telephone line. Thus, a user wishing to use two telephone lines required two telephones, usually sitting side by side on a desk. Advances in technology soon replaced the two telephones with a single multi-line instrument, thereby reducing the clutter and allowing for greater flexibility in the use of the telephone network.

This same problem is again beginning to be felt in that smart terminals, such as personal computers, are now appearing on many desks alongside the telephone. The great challenge is to incorporate such terminals into the communication patterns of users in a manner consistent both with efficient use of the intelligence of the computer and the efficient use of the telephone communicating network and its supporting switching equipment. Using such a combination of technical disciplines, users can be provided with communication services and operating procedures not even contemplated before.

As an example, many people who have had the experience of establishing conference connections between themselves and several other individuals each located at different remote terminals become confused as to the actual parties participating in the conference and even how to establish such conferences. As it stands today, at the very minimum, a user must manipulate a series of buttons on the telephone instrument, or flash a switch hook in a precise manner, to achieve a conference. During such a conference setup, there is inevitable confusion as to who is connected to the conference. As people enter and leave the conference, the confusion increases.

SUMMARY OF THE INVENTION

I have solved these problems by using the visual display of a smart terminal (such as a personal computer) and creating thereon, under control of the user, an image, or icon, representative of potential parties to be called. An icon can be, for example, a small image of a telephone with a user's name or number associated therewith. Also created on the display by the personal computer are areas, or boxes, each representative of a potential communication connection pertaining to the conference connection. These areas are called call appearances and, to establish a communication connection, the user simply moves one or more icons into the desired call appearance box and the personal computer translates the icon movement into signals for presentation to the communication system which then operates to complete a communication connection from the user's terminal to the terminal (or terminals) associated with the icon (or icons) moved into the call appearance box.

In one arrangement, an icon is created for a particular desired called party under control of the user and a unique identification of that party is associated with that icon. Thus, a user may easily determine which parties are connected to a conference by reading the identifications associated with the icons within any call appearance box.

To remove a party from a conference connection the user moves the icon associated with that party out of the call appearance box. The personal computer then operates to send the appropriate signals to the communication system to effect termination of the proper party from the call. The icon associated with a party who hangs-up is automatically moved outside the call appearance box by the personal computer thereby making it easy for the user to keep track of each party.

BRIEF DESCRIPTION OF THE DRAWING

These and other objects and features, together with the operation, and utilization of the present invention, will be more apparent from the illustrative embodiment shown in conjunction with the drawings in which

FIGS. 20 through 29 show flowcharts for further explaining the operation control of the system.

DETAILED DESCRIPTION

Figure 1:
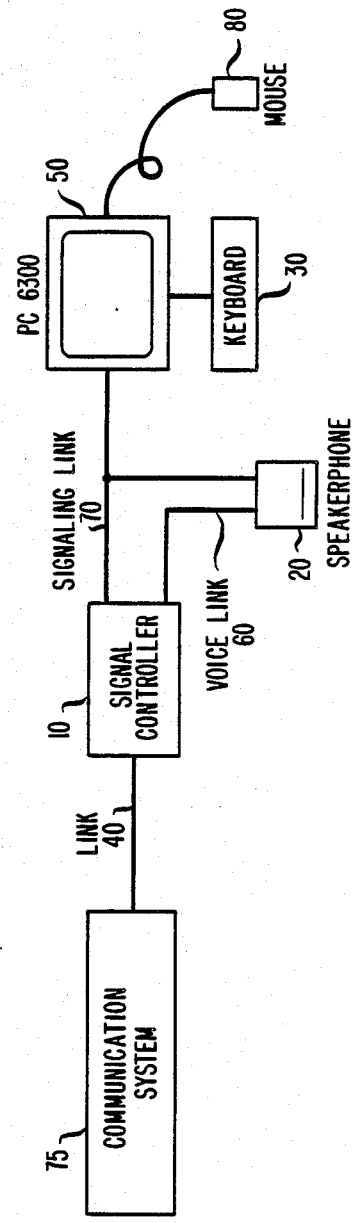
FIG. 1 shows a block diagram of my video control system.

As shown in FIG. 1, signal controller 10 is interposed between a communication system, such as communication system 75, and an intelligent workstation, such as personal computer (PC 6300). Controller 10 serves to expand link 40 from system 75 into a signaling link 70 and a voice link 60 such as is shown in U.S. Pat. Nos. 4,512,016 and 4,512,017 both issued Apr. 16, 1985, and both being hereby incorporated by reference herein. System 75 can be any communication system, such as the system shown in U.S. Pat. No. 4,389,720, issued June 21, 1983, which patent is hereby incorporated by reference herein. PC 6300, which can be any intelligent terminal such as the AT&T PC 6300, acts, as will be described, to replace a conventional communication terminal. The PC creates images which are displayed on screen 50. The user manipulates these images, as will be seen either by keyboard 30 or mouse 80, and the PC translates the movement and positioning of the images to send signals to communication switch 75 so as to control communication connections to and from the user.

Signaling channel 70 of link 40 is used to send lamp and ringer update messages, text display information, and other information from the communication system to the communication instrument. This link is also used to send switch hook status, dialed digits, and other information to the communication system.

Computer PC 6300 is inserted on the signaling channel and operates to intercept signals traveling in both directions. PC 6300 generates messages for the switch or for the instrument. The speech signal passes from the switch to the instrument unchanged.

Since computer PC 6300 is used to dial the desired connection, the telephone instrument can be replaced by speakerphone 20 or by a simple handset (not shown). The speakerphone can be controlled by a signal that can be transmitted over the signaling channel to cause the speakerphone to connect or disconnect from the speaking channel. Of course, the PC can have built into it the speakerphone as a unitary structure if one so desires.

The communication system need not be aware that the endpoint is not a traditional telephone instrument since computer PC 6300 operates to interpret all commands in both directions. However, it would simplify the task of control if the communication system to telephone instrument protocol were enhanced to include more information. As it now stands, lamp signals must be interpreted to determine certain states of the communication system. As will be seen, PC 6300 does not control the connections through the switch but rather acts only as a messenger and formatter of information, albeit in an intelligent manner. Thus, PC 6300 can only react to system stimuli but cannot actually control the system.

For purposes of this discussion, a party or user is an entity which can receive or place a communication connection. The party may represent a group member, such as one of a number of agents, or a machine. Usually a party represents a person. A call appearance is the presentation of a communication connection on a communication or telephone instrument. Each user may be engaged in several independent connections or calls, which are presented in different call appearances. Typically, only one call appearance can be active at any point in time, meaning that the communication path between the user and the other parties is enabled. Inactive call appearances are said to be on hold. The maximum number of call appearances that can be used simultaneously depends on the telephone instrument and the communication system parameters. The number can be changed by coordinated changes to system translation and the telephone instrument.

The user of the telephone instrument is assumed to always be a party to any active call taking place on that instrument. For purposes of this discussion, I will refer to this party as the local party. Other parties to the call are remote parties. This terminology is, of course, relative to a particular user, not intrinsic to the call itself.

There are three sources of actions that affect the system: selection and movement actions by the user; speakerphone button pushes by the user; and ringer, lamp, and text display update messages sent by the communication system. The outputs of system 75 are used to update the user's display and to control the speakerphone. The outputs from PC 6300 serve to send button push signals to the system to accomplish the commands requested by the user and to control the speakerphone.

The processing of user commands ultimately produces a sequence of button push signals to system 75. The proper sequence of button signals is a function of the current state and the desired state. PC 6300's function is to determine how to move from the current state to the desired state. It may involve a single button push signal, or a sequence of button push signals followed by specific responses from system 75.

System 75 actions are used to update the state information. The meaning of certain lamp update signals must be interpreted relative to the current state. In following a sequence of actions to carry out the user's command, PC 6300 uses the state information being updated by incoming lamp update messages.

Figure 2:
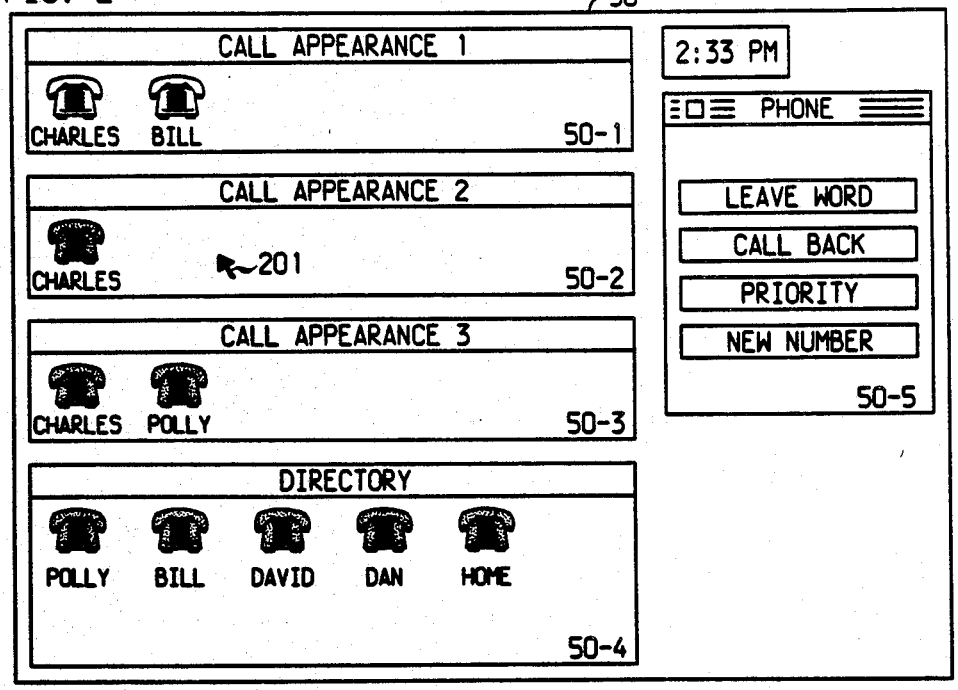
FIGS. 2 and 3 show graphical screen presentations.

A typical appearance of terminal PC 6300 screen 50 is shown in FIG. 2. There are four main windows: three call appearance windows 50-1, 50-2, 50-3 and one window 50-4 labeled directory. Another window 50-5 on the right displays areas which operate as buttons would on a traditional terminal. This area can dynamically change and can be a compliant screen as shown in U.S. Pat. No. 4,542,375, issued Sept. 17, 1985, and hereby incorporated by reference herein.

Within the windows on the left appear phone images or icons representing named parties. When an icon is within one of the call appearance windows, it represents a call between that icon and the other icons shown in the same appearance. Window 50-4 serves as a source for these icons. Using cursor 201, the user may pick up and move (as will be discussed) a selected one of these icons to one of the call appearance windows, thus placing a call. Similarly, moving an icon out of a call appearance window drops the party associated with the icon.

A call selection is made by positioning cursor 201 over the desired call appearance, or over no call appearance, and pressing (clicking) a particular button. When using a mouse, such as mouse 80, FIG. 1, the cursor is positioned by moving the mouse. Otherwise, keyboard 30 keys are used to move the cursor. A party icon is moved by positioning cursor 201 over the icon image to be moved, giving a command to start the movement (pressing a button on the mouse for example), moving the cursor (together with the icon) to the destination, and giving another command (releasing the mouse button) to release the icon. If a compliant screen were used, as discussed previously, a finger could be used to move the icon.

Icons may be gray or white. Within a call appearance window, white icons represent the active call the one connected to the speaker. Gray icons represent calls on hold, ringing lines not yet answered, calls being dialed and so forth. At most, one call appearance may be active at a time.

Moving an icon into a window, or clicking the mouse when the cursor is in the window, makes that window active and deactivates all other windows. Selecting the background, for example, by clicking the mouse with the cursor positioned in the background deactivates the active window without activating another. Conferences may be set up simply by moving several icons into the same call appearance. Thus, two-party calls, conferences and transfers are accomplished by the same actions of moving icons about the screen. Hold is automatic when a call becomes inactive since a call is dropped only when an icon is moved out of the window.

An incoming call causes a labeled icon to appear in one of the call apperances and PC 6300 generates the traditional ringing sound. The call is answered by moving the cursor into the desired window and clicking in the window.

Figure 3:
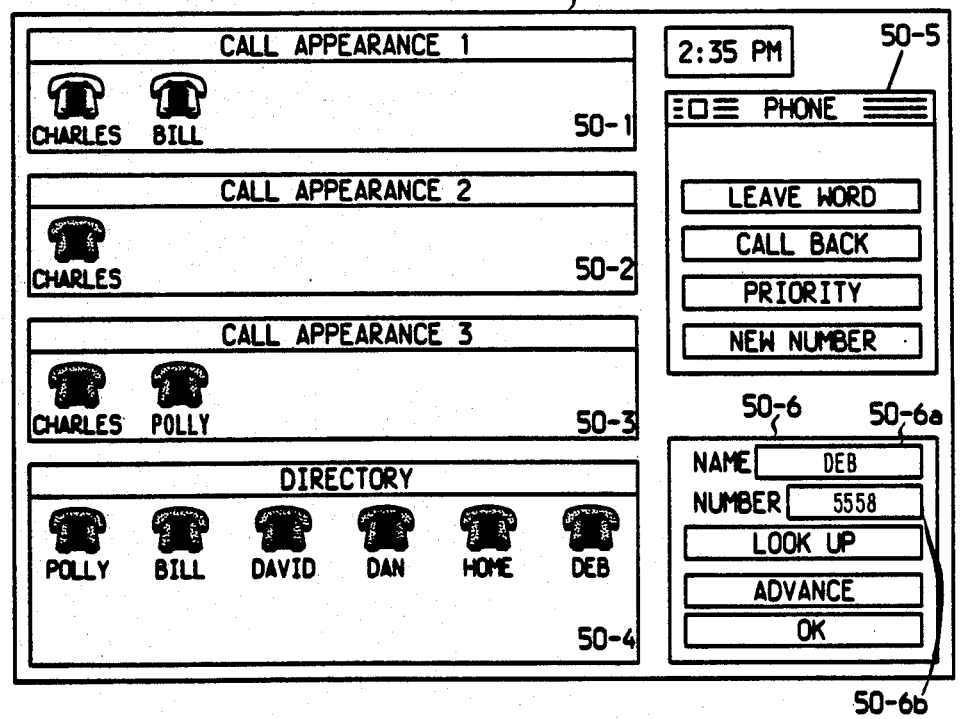

New icon associations can be entered in window 50-4 using the new number button in window 50-5. Operating the new number button brings up an auxiliary window 50-6, shown in FIG. 3.

Initially, when window 50-6 is created, boxes 50-6a and 50-6b are empty. The user may then, using the keyboard or other means, enter any person's name in box 50-6a or enter any person's number in box 50-6b. Pressing the look-up button causes the system to find the proper call correlation data and to create an icon, such as Deb, in window 50-4 associated with that data. Directory look-up is accomplished in any well-known manner, such as, for example, as shown in U.S. Pat. No. 4,453,217, issued June 5, 1984, which patent is hereby incorporated by reference herein. The advance button may be used to scan further directory entries. The OK button closes the window and places the new entry, Deb, in directory window 50-4.

Each call apperance, and within a call appearance, each party on the call is associated with various states. For the most part, the states of each call appearance and each party will be described independently. After these will be described, the interrelationships between the various states will be described. It is important to note that in this arrangement the terminal recreates, from various signals on link 70, a critical subset of communication system states. The state that are recreated are, as will be seen, necessary for controlling various system functions, such as conferencing, from PC 6300. The icons associated with each state for each party can be made to change appearance, i.e., mostly dark, light gray, reversed image or change in color or shape, depending upon the state of the party.

The parties involved in one call appearance are, in one embodiment, constrained to follow the following rules:

1. If the local party state is "idle", then the other party states are changed to "absent".
2. If all remote party states are "absent", the local party state is "idle", but the call appearance can be active.
3. If the local party state is changed to "hold", then all remote party states are changed to "hold".
4. If the local party state is changed from "hold" to "active", each of the remote party states reflects the hold state at that remote party's instrument.
5. On an incoming call, an idle call apperance is selected, the call appearance state is changed to active, and the local party's state is ringing.
6. An attempt to change the local party'state to "hold" when the call state is "selected" changes the local party's state to "idle" and the call appearance state to "idle".

Figure 4:
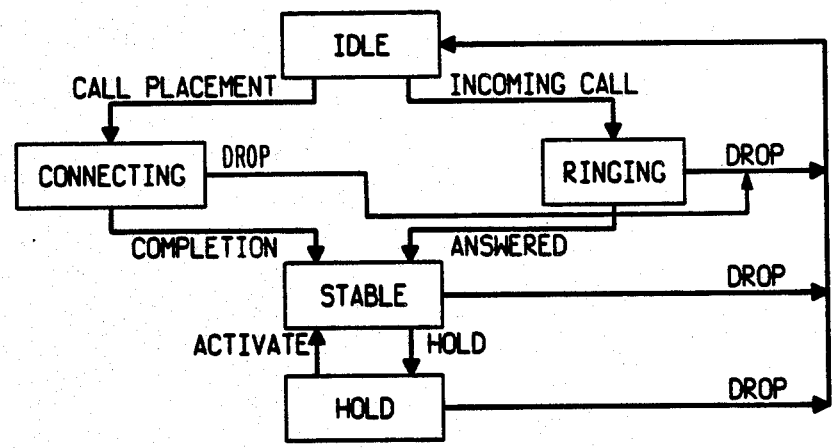
FIGS. 4 and 5 are transition state diagrams.
Figure 5:
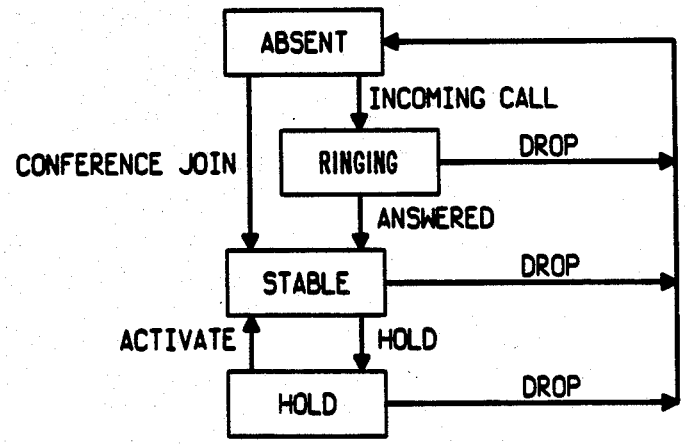

FIGS. 4 and 5 show a local party state transition diagram and the following section describes the effect on the state machines that user actions cause. The actions that a user may perform are: selection of a call appearance and movement of a party from one place to another. The actions which cannot be controlled by the user are: creation of an incoming call, a remote party drops and a remote party adds. The behavior of the system depends not only on what objects the actions are applied to but also on the previous state of the system. Since the user may take a large variety of actions at any time, and the state of the system as a whole is complex, the actions described herein are illustrative rather than exhaustive.

The user may select a call appearance or select no call appearance. Any selection automatially de-selects any previous selection. Selection of a call appearance generally makes that appearance the active call appearance, and puts any previous active call appearance on hold. Selection of no call appearance only puts the previous active call appearance on hold.

The user may move on icon from one place on the screen to another. Each icon is either positioned within a call appearance, or positioned in no call appearance. When an icon is moved inside a call appearance, the action is generally to connect the user associated with that icon to that call. The movement of an icon out of a call appearance is generally to disconnect that user from the call.

The local user's icon is shown permanently located within each call appearance. Thus, when another party's icon is moved within the call appearance, a call is established.

Movement of an icon out of the directory leaves, in the embodiment shown, a copy of the icon in the directory. Mechanisms may exist to scroll the directory or to perform other search operations intended to facilitate the location of particular items within it. The user generally deals with names only, with the numbers being supplied by the PC or by the system under control of the PC.

Figure 6:
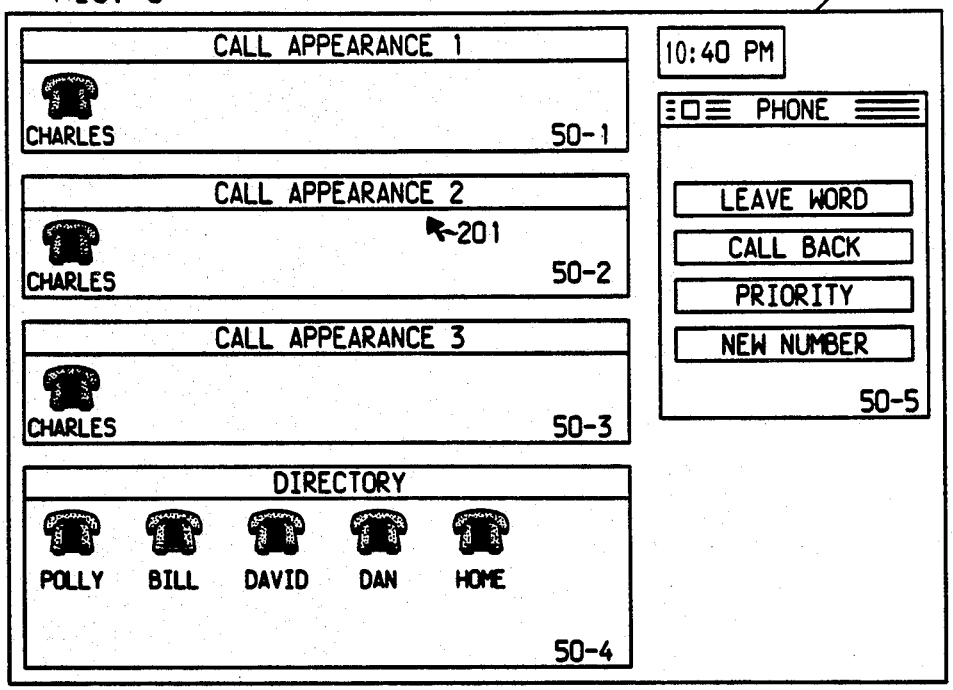
FIGS. 6 through 18 are screen presentations showing various states of the system.

FIG. 6 shows all call appearances idle and the icons are shown gray. Cursor 201 is resting in appearance 50-2.

Figure 7:
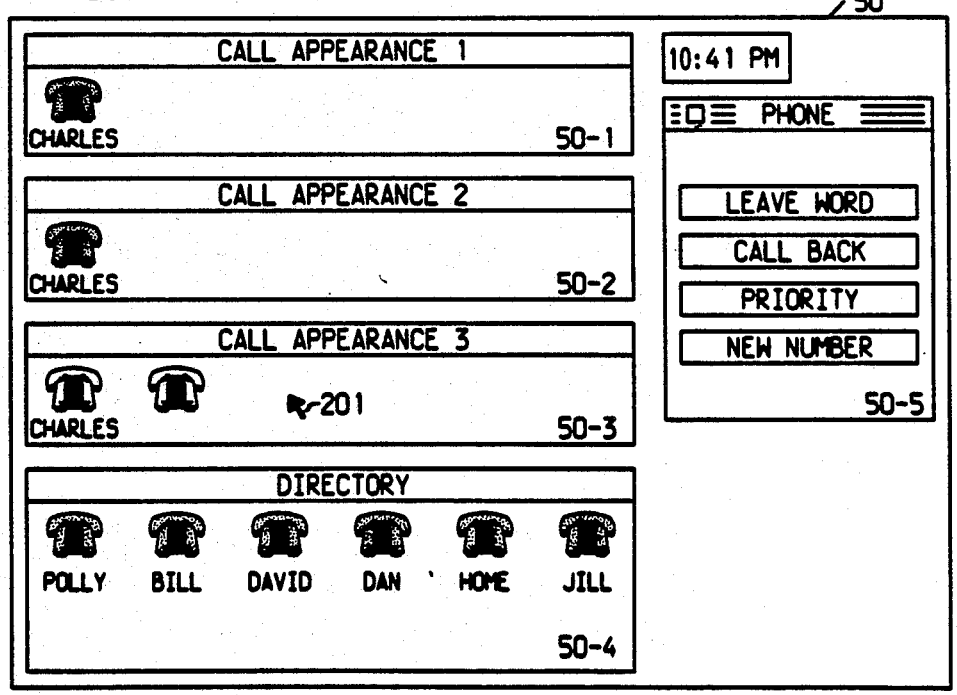

In FIG. 7, the local user, named Charles, selects a call appearance by manipulating the mouse (or other device) so that the cursor moves to the desired appearance 50-3. The mouse is clicked in window 50-3 and the speakerphone becomes active to provide dial tone to the user. The local state, FIG. 4, goes to connecting. A blank icon appears in appearance 50-3 signifying that a remote party must be identified to complete the calling connection. This is accomplished by typing the called party's name or number on the keyboard.

Figure 8:
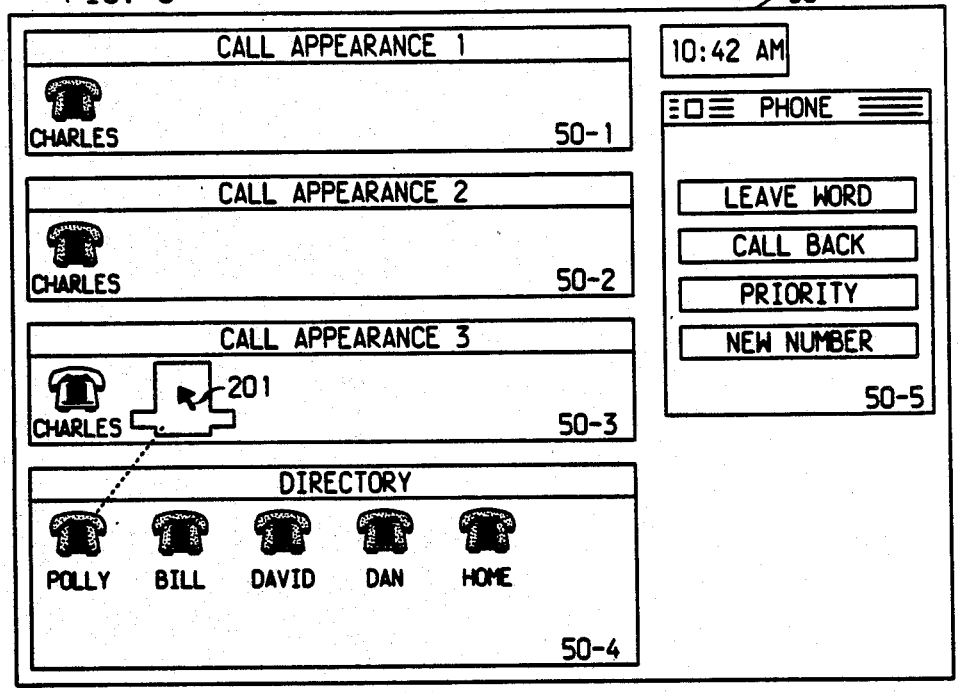

FIG. 8 shows the icon associated with the remote user Polly being moved (duplicated) from directory 50-4 to call appearance 50-3. The local party state (FIG. 4) remains in connecting and the remote party state (FIG. 5) goes to ringing.

Figure 9:
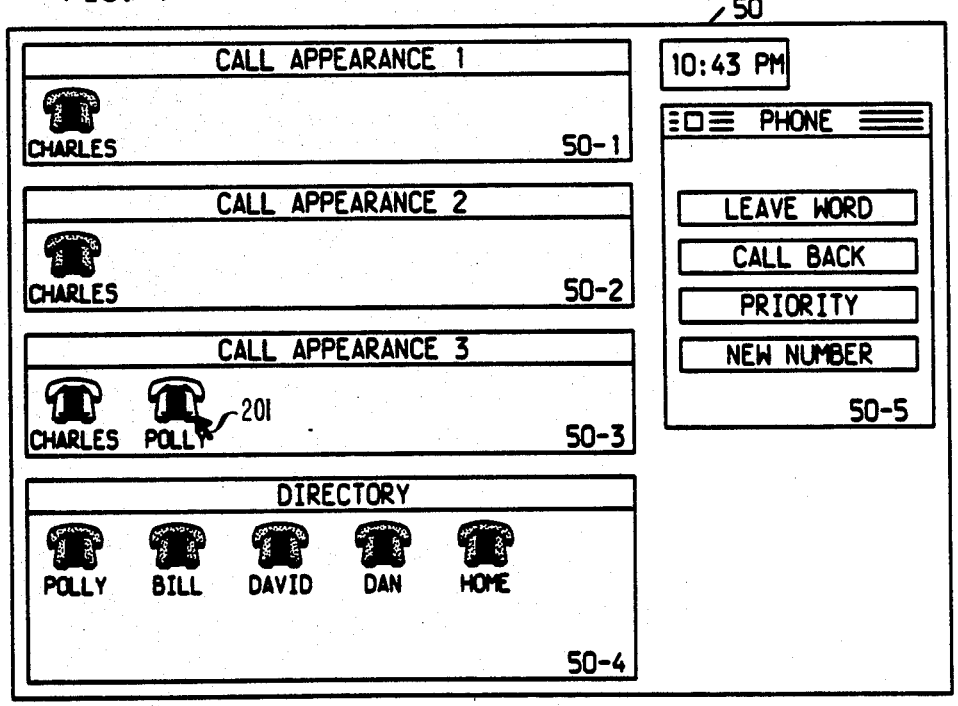

If the call is answered, as shown in FIG. 9, the name of the answering party, Polly in this case, is placed in conjunction with the remote party icon in appearance 503, and the state of both parties are changed to stable. The Charles icon is changed to white indicating an active call.

Figure 10:
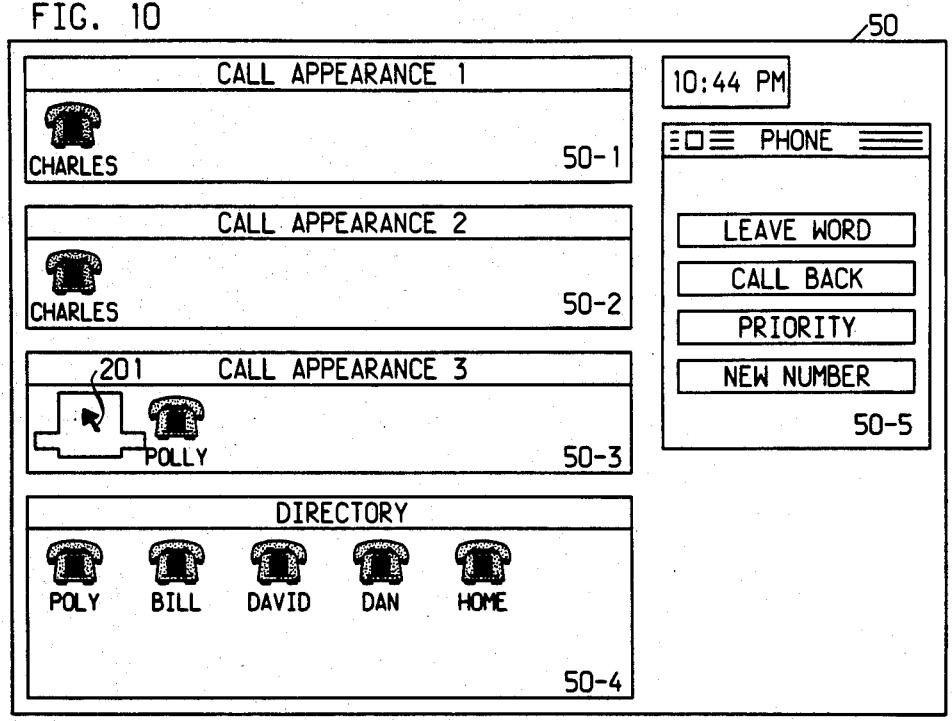

In FIG. 10, the local icon, Charles, has been moved to no call appearance (sometimes called the background), thereby causing the communication connection to drop.

Figure 11:
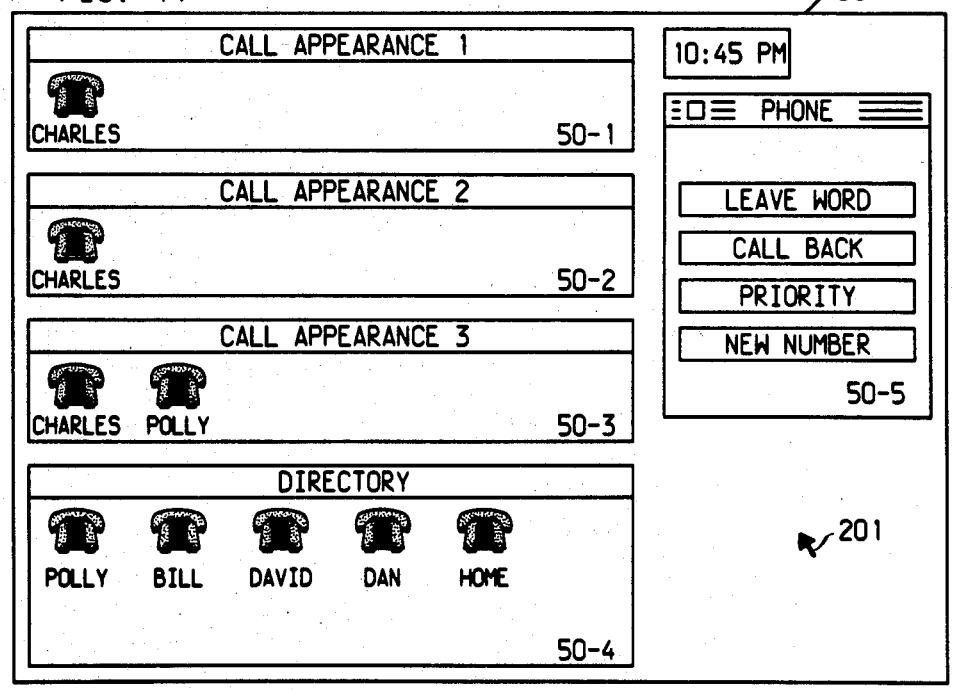

In FIG. 11, call appearance 50-2 has been selected and, if the previous call had not been dropped, it would now be placed on hold, as shown by the gray icons in appearance 50-3. This is accomplished by clicking cursor 201 in a non-call appearance.

Figure 12:
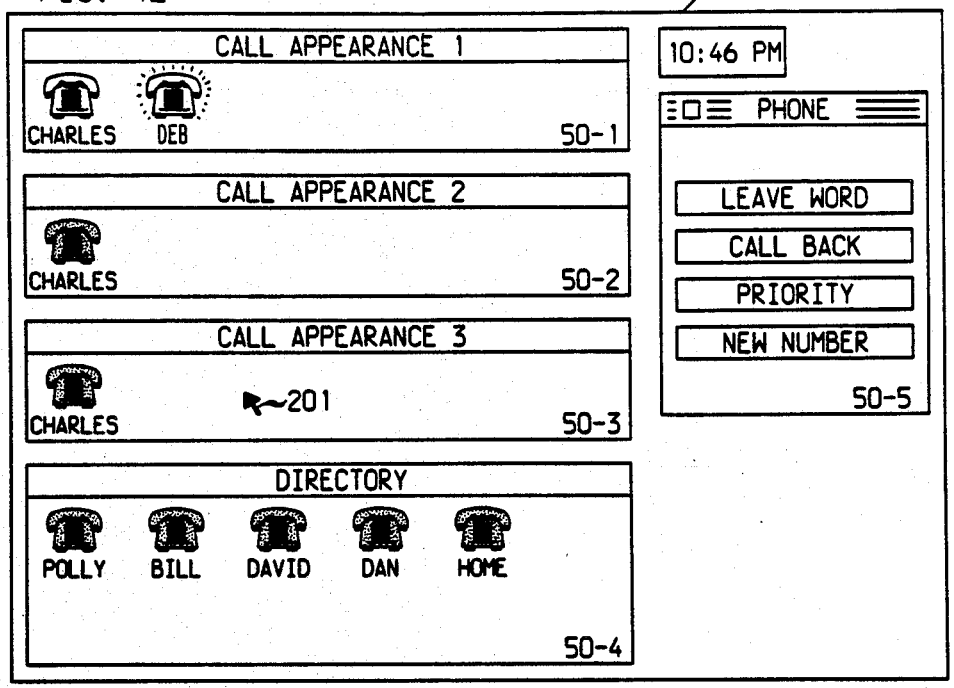
Figure 13:
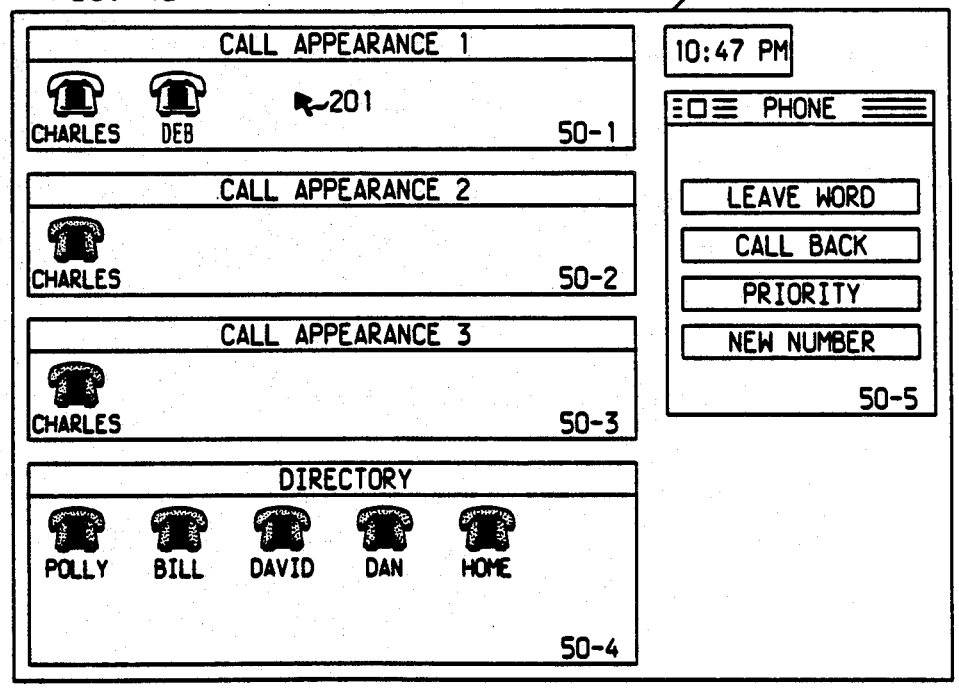

On the other hand, if the remote party drops, as shown in FIG. 12, that remote party icon changes to absent and the call changes to idle. At the same time there is an incoming call from Deb at call appearance 50-1. In such a situation, remote party icon, Deb (or blank, if the name is not known) is placed in an idle call appearance 50-1 and the phone is shown ringing (blinking on the screen or separate color) and the PC 6300 provides an audible indication of ringing. Note that the Deb icon did not have to be in directory 50-4 prior to the incoming call. As shown in FIG. 13, the cursor 201 is moved to appearance 50-1, clicked, and the connection is completed, under control of signals sent from PC 6300 to system 75.

Figure 14:
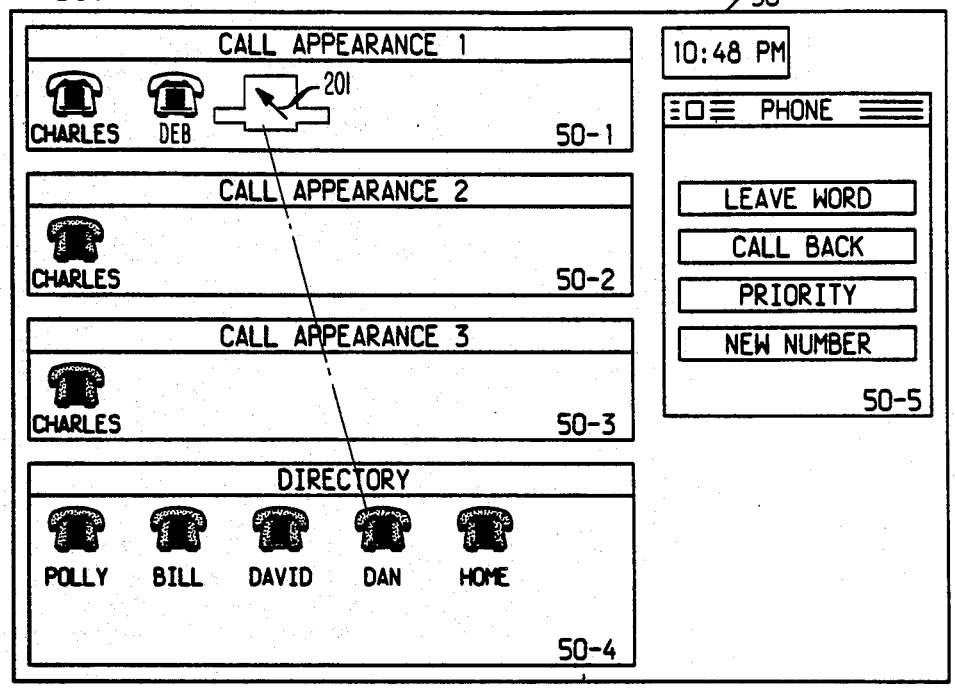
Figure 15:
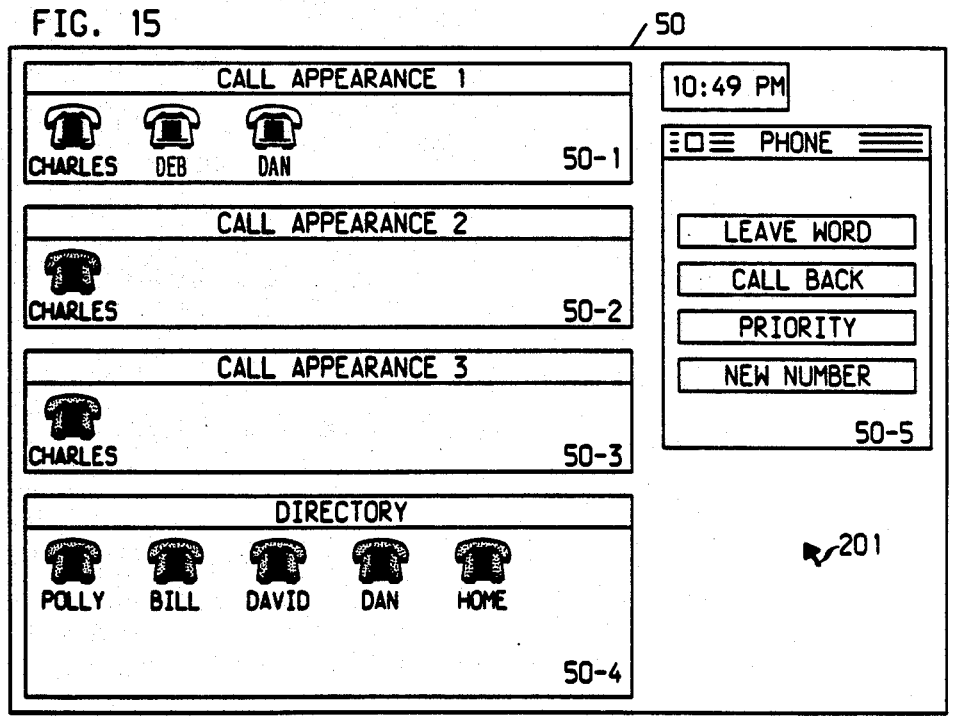

Continuing with call appearance 50-3 and assume that an active two party call continued, as shown in FIG. 14, and also assume that a conference call is desired with a party called Dan. Then, the icon labeled Dan from directory 50-4 is moved to active call appearance 50-1. The selected party icon starts as ringing until answered, then changes to stable with the name Dan displayed, as shown in FIG. 15.

Figure 16:
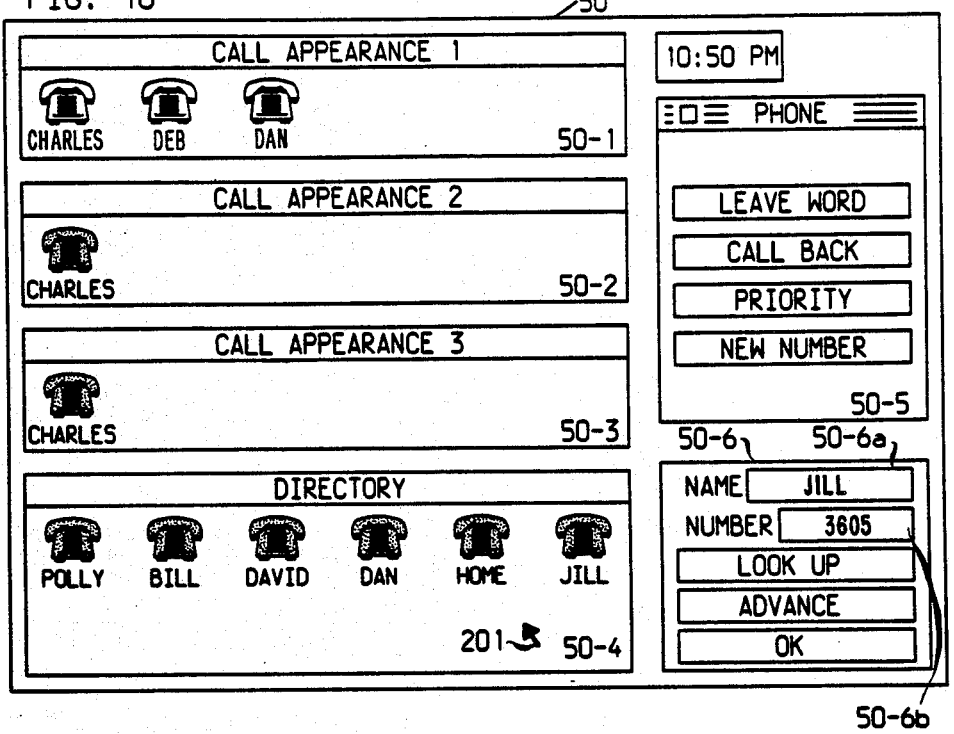

In FIG. 16, the three-party conference between Charles, Deb and Dan continues while the local user establishes a new icon, Jill, in the directory. This has no effect on the conference connection.

Figure 17:
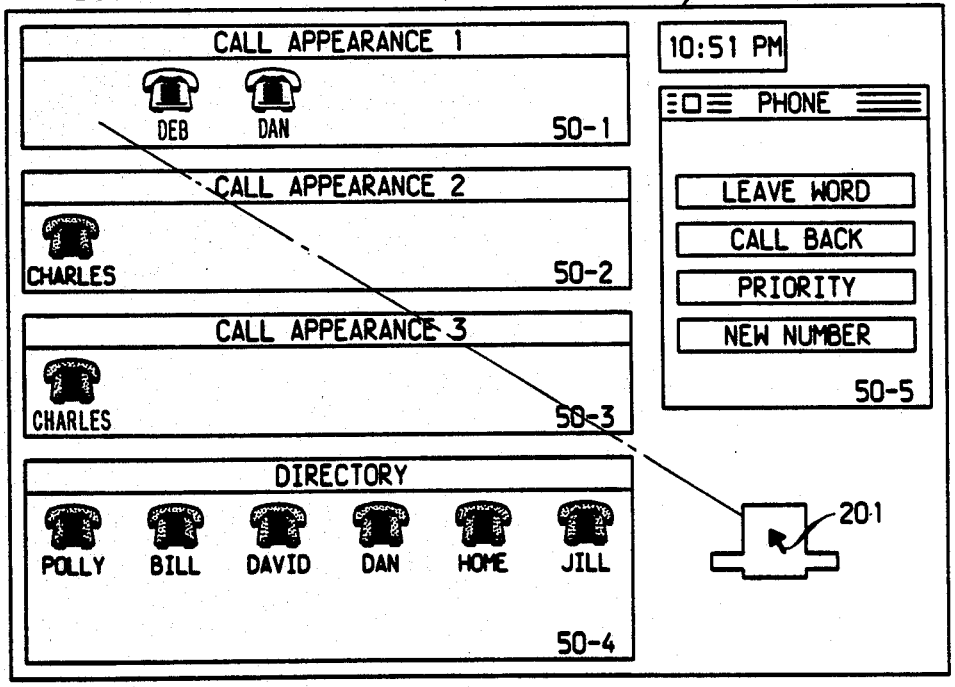
Figure 18:
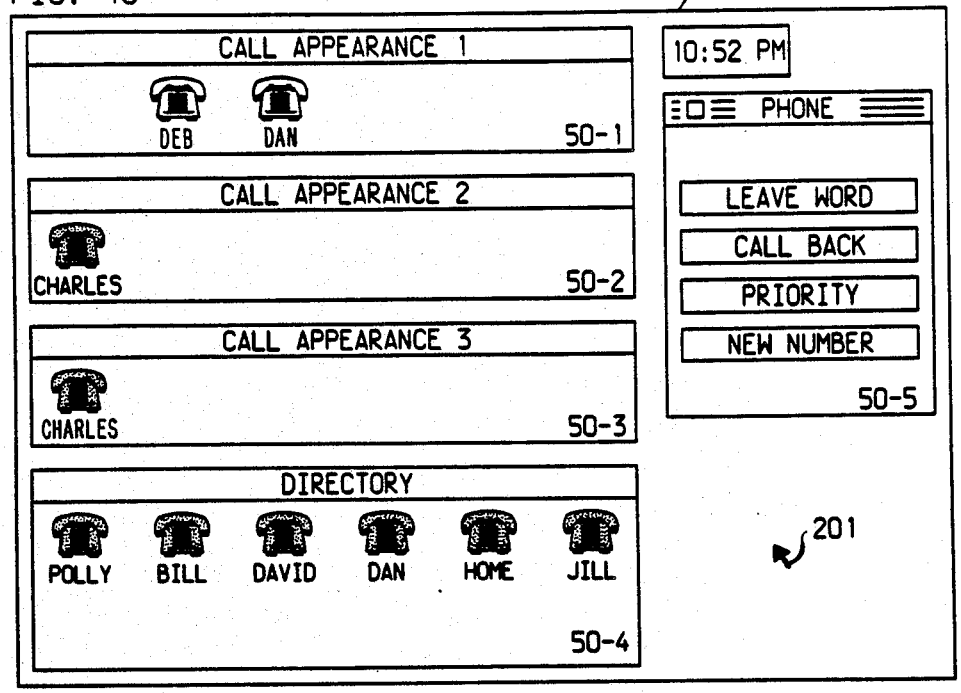

In FIG. 17, the local party, Charles, is moved to a no call appearance portion of the screen, thereby dropping the local party Charles from the call. This leaves a call between Deb and Dan, as shown in FIG. 18. This type of operation can be used for call transfer as well. In the call transfer mode, a connection could be established in a different call appearance box between Charles and any other party. Typically, when the local party has become disassociated from a call, that call is dropped from the screen and the call appearance is cleared. In some situations, for example when PC 6300 is used as an attendant console, the call appearance showing two or more remote parties will remain active, as shown in FIG. 17.

Assuming for a moment that instead of the local party dropping from the call, one of the remote parties such as Deb, went on hook. In situations where the communication system provides remote party disconnect information to the telephone, the remote party icon would change to the absent state and would disappear from the display. The call then continues as a two-party call. If the communication system does not provide remote party disconnect information to the telephone station (while another remote party is still connected) then the icon would remain on the screen until all remote parties go on-hook.

Figure 19:
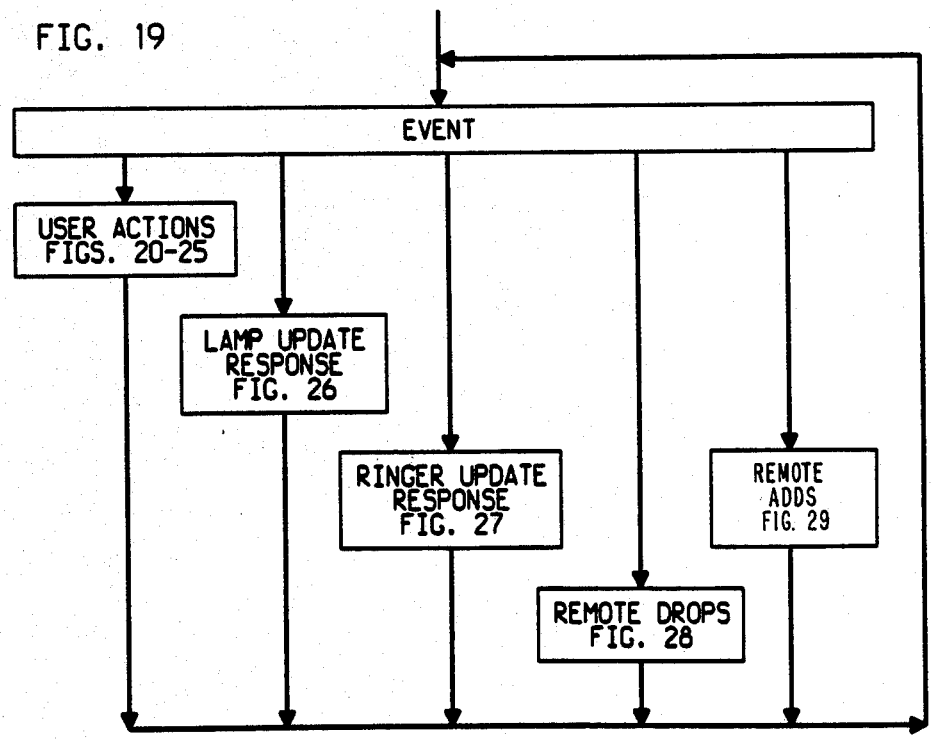
FIG. 19 is a closed loop system diagram showing the interrelation of the several event loops.

While only a few of the possible scenarios have just been described, many more are possible using my concepts. A summary of certain of these can be constructed using the following flowcharts in which FIG. 19 is a closed loop flowchart showing the arrangement of FIGS. 20 through 28;

FIGS. 20 through 25 are flowcharts describing user actions; and

Figure 26:
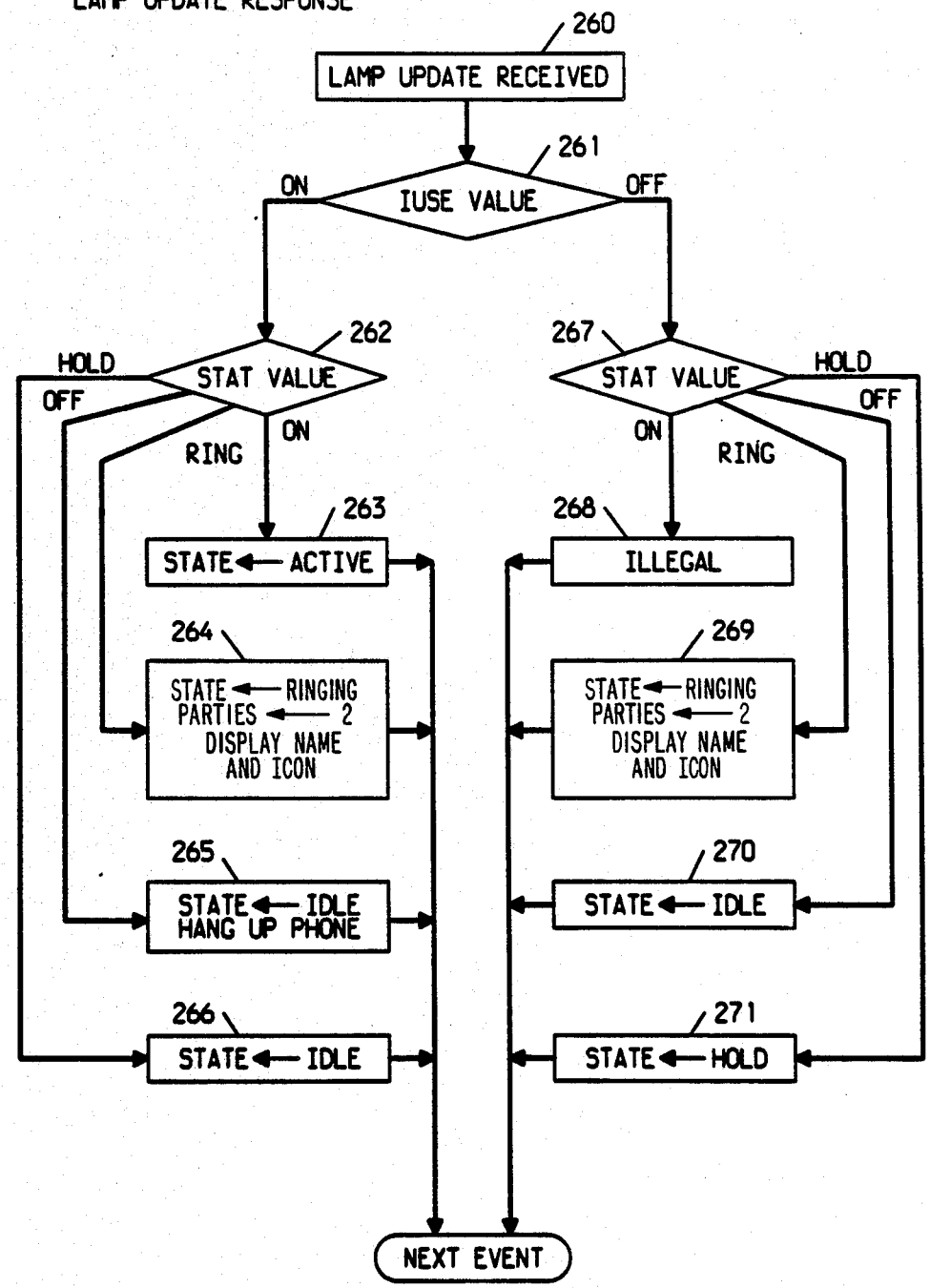
Figure 27:
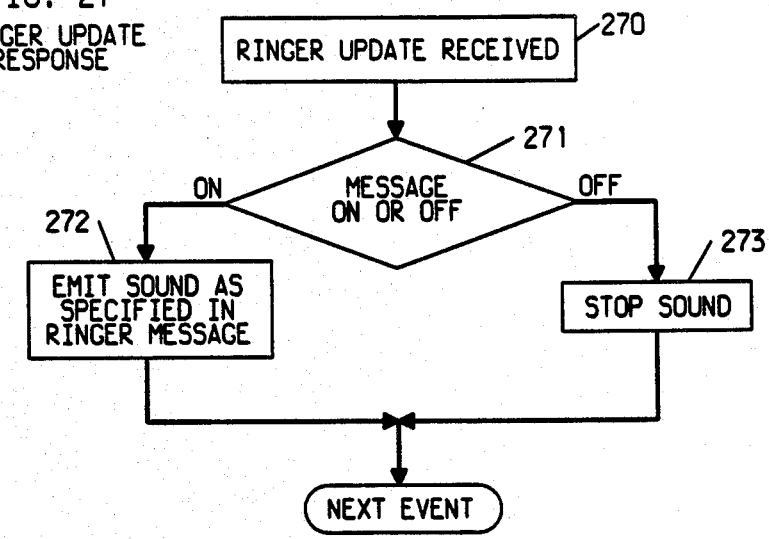
Figure 28:
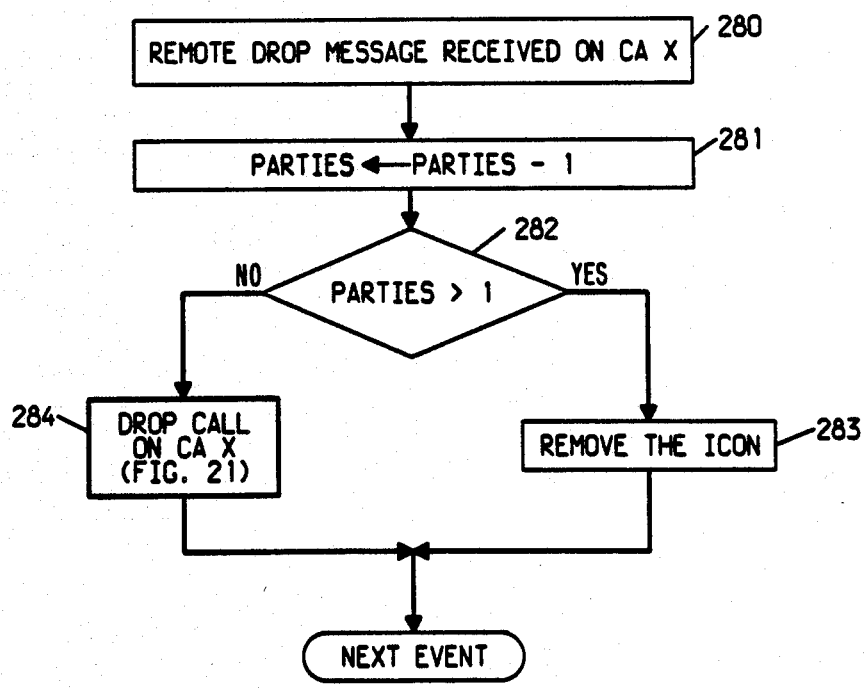

FIGS. 26 through 28 are flowcharts describing responses to system actions.

Figure 20:
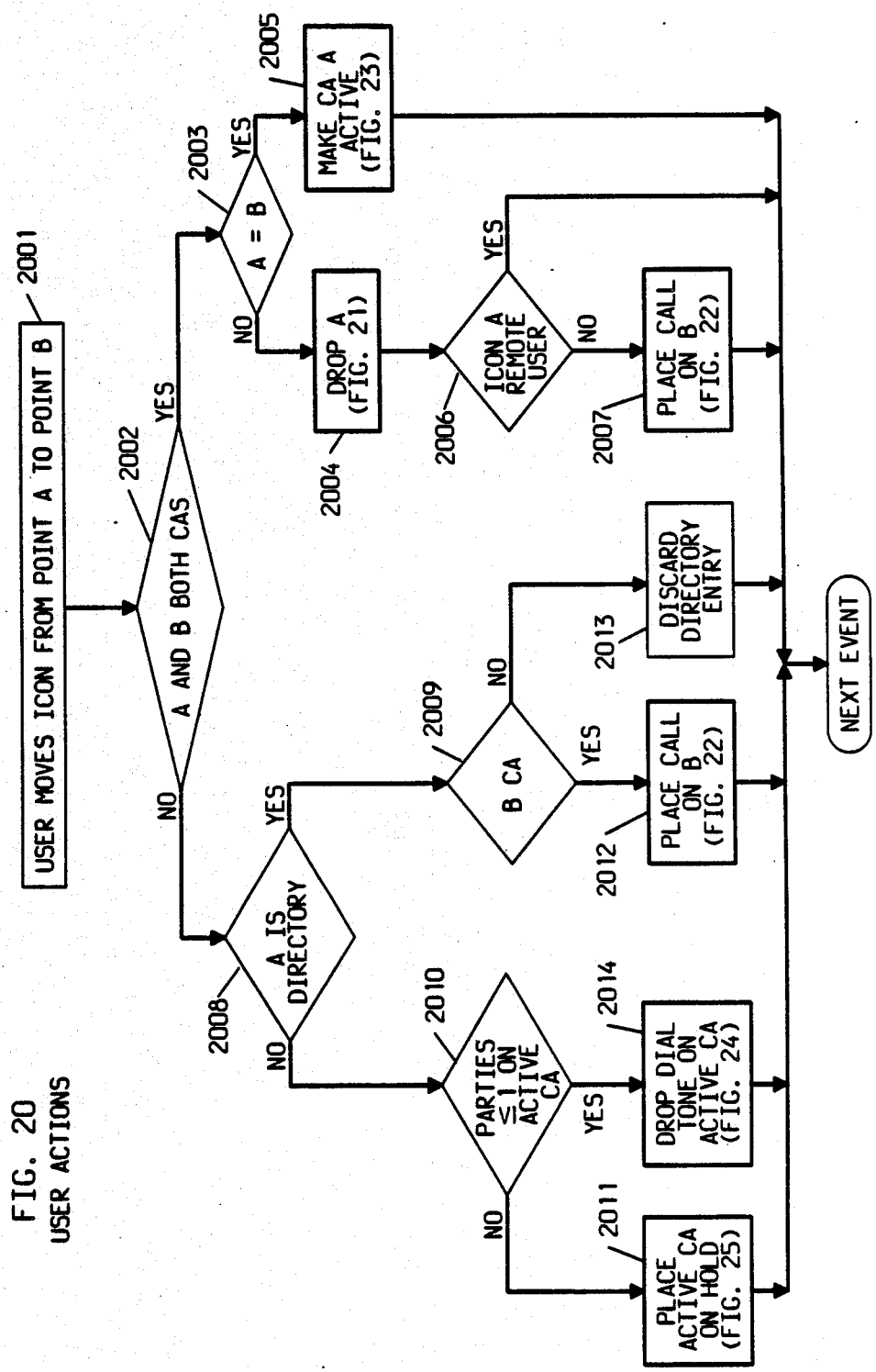

Turning now to FIG. 20, the user actions will be explained in more detail. The convention used in the flowcharts is that heavy boxes describe actions the flowchart of which will be contained on a separate figure. The lighter lined boxes represent direct actions or inputs while the diamond boxes show decision points. Call appearance has been abbreviated CA.

Assume that, as shown in box 2001 of FIG. 20, the user moves an icon from point A to point B on the video screen. The decision point 2002 decides whether point A and point B are both call appearances. If yes, decision point 2003 determines whether points A and B are within the same call appearance. If points A and B are within the same call appearance, then box 2005, in the manner to be more formally detailed with respect to FIG. 23, makes call appearance A active. This action represents the symbol of a call appearance. On the other hand, had points A and B not been within the same call appearance, the system would be instructed to drop point A, in the manner set forth in FIG. 21, and to check whether the icon is a remote user, via box 2006, and if the icon was not a remote user, a call would be placed to the user represented by the icon on call appearance B box 2007, in the manner set forth in FIG. 22. As shown in box 2006, if the icon had been a remote user, it would have been dropped.

Returning now to box 2002, if point A and point B had not both been call appearances, then box 2008 would check to determine if point A is the directory. If point A is the directory, box 2009 would check to see if point B is a call appearance or not a call appearance. This action would signify that an icon is being moved from a directory. This could either be a call placing or the discarding of an icon from the directory. If point B is a call appearance, box 212 would place a call on point B, in a manner set forth in FIG. 22, since this action represents moving an icon from the directory to a call appearance. This would either be a call origination or a conference call depending upon the number of parties already on the call.

If decision point 2009 had determined that point B was not a call appearance, then box 2013 would operate to discard the directory entry, thereby moving an icon from the directory.

Returning to box 2008, if point A is not a directory, box 2010 determines whether there is less than one party still active on the call appearance. If not, box 2011, as shown in FIG. 25, places the active call appearance on hold. This action represents a selection of no call appearance when there is an active call which is defined as the hold condition. If there are one or fewer parties active on the call appearance, box 2014, as shown in FIG. 24, operates to drop any dial tone and terminate the call.

FIG. 21 is a flowchart representing a call to be dropped on call appearance (CA) X. If the call appearance is to be put on hold, such action will be shown in FIG. 25. If call appearance X is already active, as shown in box 2011, box 2013 checks to see if the local user is being dropped or if there are two or more parties. If such is the situation, then the connection is allowed to remain, but an on-hook is sent to the switch under control of box 214 and the speakerphone is disconnected. If, on the other hand, there were less than two parties and it was not the local user dropping off, then a drop message for the user will be sent and the icon removed under control of box 215.

FIGS. 22 through 25 are self-explanatory.

FIG. 26 shows the lamp update response to the lamp messages from the communication system. Each call appearance is associated with two lamps which are known as "iuse" and "stat". The messages from the communication system control various lamp states such as on, off, ring (slow flash) or hold (fast flash). Each time a lamp update is received, the states of the two lamps are used to update the state of the corresponding call appearance. The flowchart illustrates how the state is derived. Boxes 263, 264, 265, 266, 269, 270 and 271 would also control the icon appearance to denote state information on the display to the user.

The flowchart of FIG. 27 describes the system's response to ringer update messages from the switch. The ringer messages do not affect the call appearance state at all but are used to control the sound generator on the PC. The message can command the sound generator to turn off or to produce sound of various frequencies and cadences.

Figure 29:
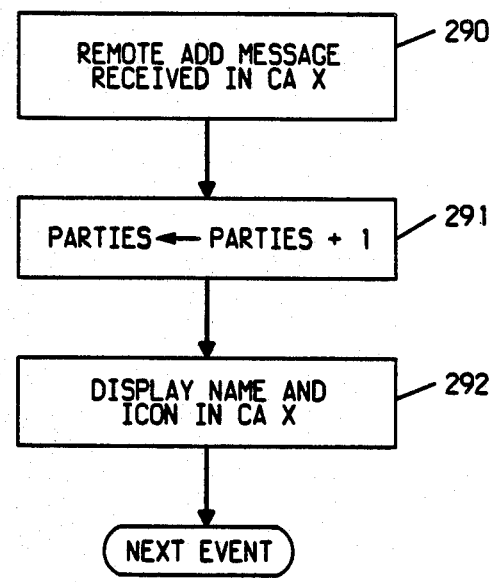

The flowcharts of FIGS. 28 and 29 describe the system's response to hypothetical remote drop and remote add messages from the switch. The current generation of communication system software typically does not provide these messages, but an enhanced protocol message set could provide these messages or their equivalents. These messages would then be used to inform the PC 6300 of another party dropping from (or adding to) the call.

Conclusion

While PC 6300 is shown as controlling a single station, there is no reason why several stations, or lines, cannot be controlled from the same PC. Different call appearances, or different colors, can be used for each station or line. In addition, several PC's can be linked to control a single line, these PC's can then either act independently of each other or as an interactive network. This system can be by an attendant at a central position to control communications to or from a number of remotely located stations, all without departing from the spirit and scope of my invention.

In addition, while the system I have described is operable over the communication path and replaces a telephone instrument, the concepts taught can be used independent of a telephone link for the control of parties other than a particular phone user. This could be a central administrator or control maintenance panel and may be connected to the system controller.

What is claimed is:

1. A terminal for use with a communication system, said communication system operable for controlling communication connections between a plurality of terminals under control of signals transmitted between said communication system and said terminals, said terminal comprising,
    display means,
    means for establishing on said display means first and second visually distinct areas,
    means for visually displaying a plurality of images on said display means, each said image representative of one of said plurality of terminals,
    means for controlling the movement of said images into and out of said first and said second visually distinct areas, said controlling means operative in response to signals provided by a user at said terminal, and
    means responsive to the movement of two images into said first visually distinct area for sending signals to said communication system representative of a desired communication connection between the terminals associated with said two images.

2. The invention set forth in claim 1 further comprising means responsive to the movement of a third image into said first visually distinct area while said first and second images remain within said first visually distinct area for sending signals to said communication system representative of a desired conference connection between the terminals associated with said first, second and third images.

3. The invention set forth in claim 1 wherein said signals are communicated between said terminal and said communication system over the communication path extending between said communication system and said terminal.

4. The invention set forth in claim 1 wherein said images which are within said first visually distinct area have a plurality of distinct appearance modes, one of said appearance modes representative of a desired communication connection and another of said appearance modes representative of an actual communication connection, and
    means controlled by the joint exchange of signals between said terminal and said communication system for establishing a particular one of said appearance modes for each said image.

5. The invention set forth in claim 1 further comprising means operative in response to the movement of an image out of said distinct area for sending signals to said communication system for the removal of the terminal associated with said removed image from the communication connection associated with said visually distinct area.

6. The invention set forth in claim 1 further comprising means controlled by a user at said terminal for creating or removing a particular image from said display.

7. The invention set forth in claim 1 further comprising means controlled by a user at said terminal for creating within said second visually distinct area an image representative of a desired terminal.

8. The invention set forth in claim 1 wherein said terminal further includes a cursor and wherein said images are moved under control of said cursor.

9. The invention set forth in claim 1 wherein each of said visually distinct areas represents a separate call appearance,
    means for selecting one of said call appearances while a first communication connection is represented by images previously moved into the other call appearance for placing said first communication connection on hold.

10. The invention set forth in claim 2 further comprising means operative in response to the movement of an image out of said distinct area for sending signals to said communication system for the removal of the terminal associated with said removed image from the communication connection associated with said visually distinct area.

11. The invention set forth in claim 2 wherein one of said images within said first visually distinct area is preestablished therein.

12. The invention set forth in claim 11 further comprising means responsive to the movement of said preestablished image from said first visually distinct area while said second and third images still remain within said first visually distinct area for removing the terminal associated with the connection between said pre-established image from said connection while still allowing said second and third images to continue.

13. The invention set forth in claim 1 wherein said movement controlling means is additionally operative in response to signals communicated from said communication system.

14. A communication system operable for controlling communication connections between a plurality of terminals connected to said system, said system comprising,
    display means,
    means for establishing on said display means a plurality of visually distinct areas,
    means for visually displaying a plurality of images on said display means, each said image identifiable as a particular one of said plurality of terminals,
    means for selectively controlling the positioning of said images into and out of said visually distinct areas, in response to signals provided to said display, and means responsive to the positioning of any two images into one of said visually distinct areas for controlling the establishment of a communication connection between the terminals identified with said two images.

15. The invention set forth in claim 14 further comprising means responsive to the positioning of a third image into said one visually distinct area while said other two images remain within said one visually distinct area for controlling the establishment of a conference connection between the terminals identified with said images within said one visually distinct area.

16. The invention set forth in claim 14 wherein said images have a plurality of distinct appearance modes, one of said appearance modes representative of a desired communication connection and another of said appearance modes representative of an actual communication connection, and means for selectively establishing a particular one of said appearance modes for any said image.

17. The invention set forth in claim 15 further comprising means operative in response to the positioning of an image out of said one distinct area for controlling the removal of the terminal associated with said removed image from the communication connection associated with said visually distinct area.

18. The invention set forth in claim 14 further comprising means for selectively creating images on said display identified with particular ones of said terminals.

19. The invention set forth in claim 14 wherein said images are positioned under control of a cursor.

20. The invention set forth in claim 15 further comprising means responsive to the positioning of one of said images out of said one visually distinct area while two other images still remain within said one visually distinct area for dropping the communication connection from the terminal associated with said moved image.

21. The invention set forth in claim 14 wherein a first one of said visually distinct areas is associated with a first communication appearance, and a second one of said visually distinct areas is associated with a second communication appearance and wherein said system further comprises means responsive to the positioning of first and second images within said first communication appearance for establishing a first communication connection between said terminals associated with said first and second images and responsive to the positioning of third and fourth images within said second communication appearance for establishing a second communication connection independent of said first communication connection between said third and fourth terminals associated with said third and fourth images.

22. The invention set forth in claim 21 wherein said system further comprises means responsive to the positioning of any image within a communication appearance associated with a particular established connection for connecting the terminal associated with said any image to said particular established connection.

23. The invention set forth in claim 14 wherein a first one of said visually distinct areas is associated with a first communication appearance, and a second one of said visually distinct areas is associated with a second communication appearance and wherein said system further comprises means responsive to the positioning of first and second images within said first communication appearance for establishing a first communication connection between said terminals associated with said first and second images, and means responsive to the selection of said second communication appearance for placing said first communication connection on hold.

24. The method of controlling communication connections between a plurality of terminals in a communication system, said method comprising establishing on a visual display a plurality of visually distinct areas, creating on said display a plurality of images, each said image identifiable as a particular one of said plurality of terminals, selectively controlling the positioning of said images into and out of said visually distinct areas in response to signals provided to said display, and controlling, in response to the positioning of any two images into one of said visually distinct areas, a communication connection between the terminals identified with said two images.

25. The invention set forth in claim 24 further comprising the steps of positioning a third image into said one visually distinct area while said other two images remain within said one visually distinct area for, and controlling the establishment of a conference connection between the terminals identified with said images within said one visually distinct area.

26. The invention set forth in claim 25 further comprising the step of removal, in response to the positioning of an image out of said one distinct area, of the terminal associated with said removed image from the communication connection associated with said visually distinct area.

27. The invention set forth in claim 26 wherein said image positioning step is under control of a user manipulated cursor.

28. The invention set forth in claim 24 wherein a first one of said visually distinct areas is associated with a first communication appearance, and a second one of said visually distinct areas is associated with a second communication appearance and wherein said method further comprises the steps of establishing a first communication connection between said terminals associated with said first and second images in response to the positioning of first and second images, and establishing a second communication connection independent of said first communication connection between said third and fourth terminals associated with said third and fourth images in response to the positioning of third and fourth images within said second communication appearance.

29. The invention set forth in claim 28 wherein said system further comprises the step of connecting the terminal associated with any image to said particular established connection in response to the positioning of said image within a communication appearance associated with a particular established connection.

30. A computer program method for controlling a personal computer, said personal computer used as a partial replacement for a conventional terminal in a communication system, said communication system operable for controlling communication connections between a plurality of said terminals under control of signals transmitted between said communication system and said conventional terminals, said personal computer having a visual display, said computer program comprising the steps of,
　segregating on said display first and second visually distinct areas,
　presenting on said display a plurality of images each said image representative of one of said plurality of terminals,
　positioning in conjunction with stimuli presented by a user said images into and out of said first and said second visually distinct areas, and
　sending signals in response to the positioning of two images into said first visually distinct area to said communication system representative of a desired communication connection between the terminals associated with said two images.

31. The invention set forth in claim 30 wherein said program further comprising the steps of sending signals in response to the movement of a third image into said first visually distinct area while said first and second images remain within said first visually distinct area to said communication system representative of a desired conference connection between the terminals associated with said first, second and third images.

32. The invention set forth in claim 30 wherein said signals are communicated between said terminal and said communication system over the communication path extending between said communication system and said terminal.

33. The invention set forth in claim 30 wherein said images which are within said first visually distinct area have a plurality of distinct appearance modes, one of said appearance modes representative of a desired communication connection and another of said appearance modes representative of an actual communication connection, and wherein said program is interactive with signals between said terminal and said communication system for establishing a particular one of said appearance modes.

34. The invention set forth in claim 30 wherein said computer program is operative in response to the movement of an image out of said distinct area for sending signals to said communication system for the removal of the terminal associated with said removed image from the communication connection associated with said visually distinct area.

35. The invention set forth in claim 30 wherein said program is interactive with a user at said terminal, and operates to create or remove a particular image from said display.

36. The invention set forth in claim 30 wherein said program is interactive with a user at said terminal so that images can be positioned by said user by the movement of a cursor across said display.

37. The invention set forth in claim 30 wherein a first one of said visually distinct areas is associated with a first communication appearance, and a second one of said visually distinct areas is associated with a second communication appearance and wherein said computer program further comprises the steps of
　establishing a first communication connection between said terminals associated with said first and second images in response to the positioning of first and second images, and
　establishing a second communication connection independent of said first communication connection between said third and fourth terminals associated with said third and fourth images in response to the positioning of third and fourth images within said second communication appearance.

38. The invention set forth in claim 30 wherein a first one of said visually distinct areas is associated with a first communication appearance, and a second one of said visually distinct areas is associated with a second communication appearance and wherein said computer program further comprises the steps of
　establishing a first communication connection between said terminals associated with said first and second images in response to the positioning of first and second images, and
　establishing a hold condition with respect to said first communication connection upon the selection of a call appearance other than a call appearance associated with said positioned first and second images.

39. A terminal for use with a communication system, said communication system operable for controlling communication connections between a plurality of terminals under control of signals transmitted between said communication system and said terminals, said terminal comprising,
　display means,
　means for visually displaying a plurality of images on said display means, each said image representative of on of said plurality of terminals,
　means for controlling the movement of said images on said display means, said controlling means operative in response to signals provided by a user at said terminal, and
　means responsive to selected movement of said images for establishing communication connections with respect to said terminals represented by selectively moved ones of said images.

40. The invention set forth in claim 39 wherein said signals are communicated between said terminal and said communication system over the communication path extending between said communication system and said terminal.

41. The invention set forth in claim 39 wherein said images have a plurality of distinct appearance modes, one of said appearance modes representative of a desired communication connection and another of said appearance modes representative of an actual communication connection, and
　means controlled by the joint exchange of signals between said terminal and said communication system for establishing a particular one of said appearance modes for each said image.

42. The invention set forth in claim 39 further comprising means operative in response to the further movement of a moved one of said images for sending signals to said communication system for the removal of the terminal associated with said further moved image from said established communication connection.

43. The invention set forth in claim 39 further comprising means controlled by a user at said terminal for creating or removing a particular image from said display.

44. The invention set forth in claim 39 wherein said terminal further includes a cursor and wherein said images are moved under control of said cursor.

45. The invention set forth in claim 39 wherein said movement controlling means is additionally operative in response to signals communicated from said communication system.

46. A communication system operable for controlling communication connections between a plurality of terminals connected to said system, said system comprising,
- display means,
- means for establishing on said display means a plurality of visually distinct areas,
- means for visually displaying a plurality of images on said display means, each said image identifiable as a particular one of said plurality of terminals,
- means for selectively controlling the positioning of said images into and out of said visually distinct areas, in response to signals provided to said display, and
- means responsive to the positioning of one or more images into one of said visually distinct areas for controlling the establishment of a communication connection between the terminals identified with said positioned images.

47. The invention set forth in claim 46 further comprising means responsive to the positioning of additional images into said one visually distinct area while other images remain positioned within said one visually distinct area for controlling the establishment of a conference connection between all the terminals identified with said images within said one visually distinct area.

48. The invention set forth in claim 46 wherein said images have a plurality of distinct appearance modes, one of said appearance nodes representative of a desired communication connection and another of said appearance modes representative of an actual communication connection, and
- means for selectively establishing a particular one of said appearance modes for any said image.

49. The invention set forth in claim 47 further comprising means operative in response to the positioning of an image out of said one distinct area for controlling the removal of the terminal associated with said removed image from the communication connection associated with said visually distinct area.

50. The invention set forth in claim 46 further comprising means for selectively creating images on said display with particular ones of said terminals.

51. The invention set forth in claim 46 wherein said images are positioned under control of a cursor.

52. The invention set forth in claim 47 further comprising means responsive to the repositioning of one of said images out of said one visually distinct area while two other images still remain within said one visually distinct area for dropping the communication connection from the terminal associated with said repositioned image.

53. The method of controlling communication connections between a plurality of terminals in a communication system, said method comprising
- creating on a visual display a plurality of images, each said image identifiable as a particular one of said plurality of terminals,
- selectively controlling the positioning of said images on said display in response to signals provided to said display, and
- controlling, in response to the positioning of any image, a communication connection with respect to the terminals identified with said positioned images.

54. The invention set forth in claim 53 wherein said image positioning step is under control of a user manipulated cursor.

55. A terminal for use with a communication system, said communication system operable for controlling communication connections between a plurality of terminals under control of signals transmitted between said communication system and said terminals, said terminal comprising,
- display means,
- means for establishing on said display means first and second visually distinct areas,
- means for visually displaying a plurality of first images on said display means, each of said first images representative of one of said plurality of terminals,
- means for establishing a second image on said display, said second image being selectively movable under control of a user at said terminal, and
- means responsive to the movement of said second image into the same visually distinct area as one of said first images for sending signals to said communication system representative of a desired communication connection with respect to the terminal associated with said one first image.

56. The invention set forth in claim 55 wherein said images are controlled by signals communicated between said terminal and said communication system over the communication path extending between said communication system and said terminal.

57. The invention set forth in claim 55 wherein said images have a plurality of distinct appearance modes, one of said appearance modes representative of a desired communication connection and another of said appearance modes representative of an actual communication connection, and
- means controlled by the joint exchange of signals between said terminal and said communication system for establishing a particular one of said appearance modes for each said image.

58. A computer program method for controlling a personal computer, said personal computer used as a partial replacement for a conventional terminal in a communication system, said communication system operable for controlling communication connections between a plurality of said terminals under control of signals transmitted between said communication system and said conventional terminals, said personal computer having a visual display, said computer program comprising the steps of,
- presenting on said display a plurality of images each said image representative of one of said plurality of terminals and first and second visually distinct areas,
- positioning in conjunction with stimuli presented by a user said images into and out of said first and said second visually distinct areas, and
- sending signals in response to the positioning of an image into said first visually distinct area to said communication system representative of a desired communication connection with respect to the terminal associated with positioned image.

59. The invention set forth in claim 58 wherein said program further comprising the steps of sending signals in response to the movement of other images into said first visually distinct area while said first image remains within said first visually distinct area to said communication system representative of a desired conference connection between the terminals associated with said first and said other images.

60. The invention set forth in claim 58 wherein said signals are communicated between said terminal and said communication system over the communication path extending between said communication system and said terminal.

61. The invention set forth in claim 58 wherein said computer program is operative in response to the movement of an image out of said distinct area for sending signals to said communication system for the removal of the terminal associated with said removed image from the communication connection associated with said visually distinct area.

62. The invention set forth in claim 58 wherein said program is interactive with a user at said terminal, and operates to create or remove a particular image from said display.

63. The invention set forth in claim 58 wherein said program is interactive with a user at said terminal so that images can be positioned by said user by the movement of a cursor across said display.

* * * * *